United States Patent Office 3,467,271
Patented Sept. 16, 1969

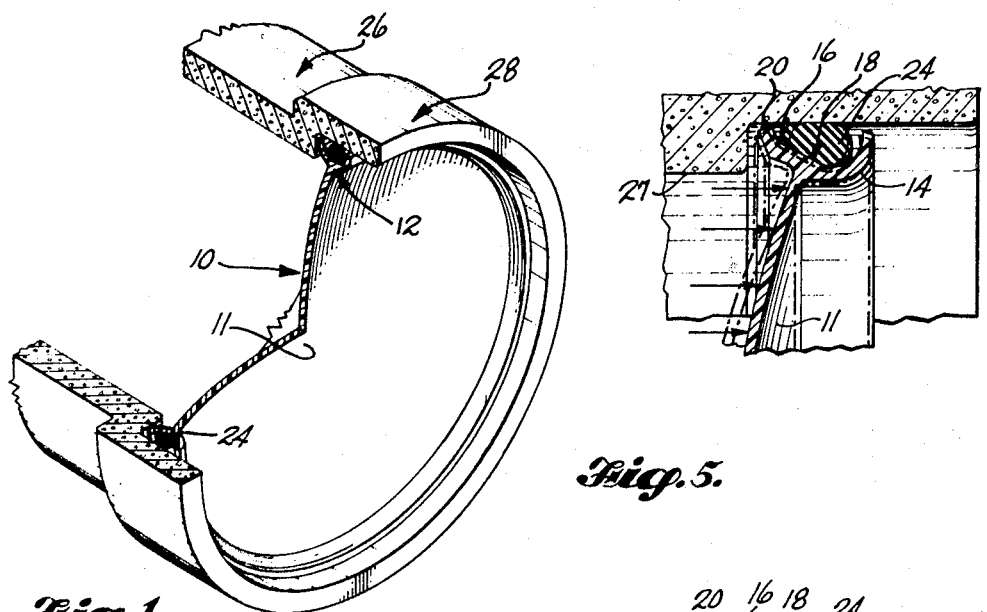
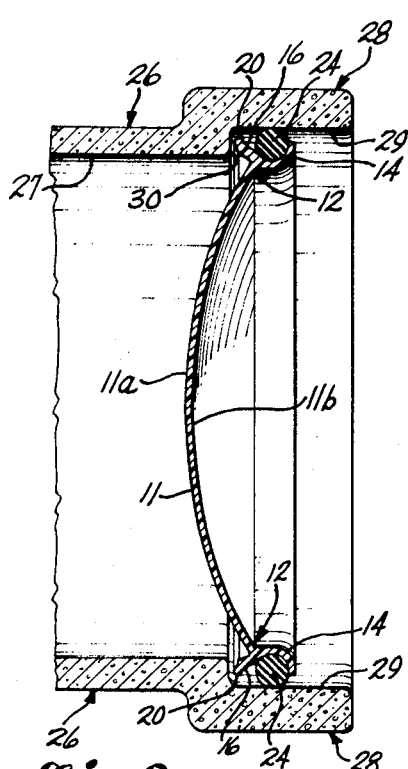
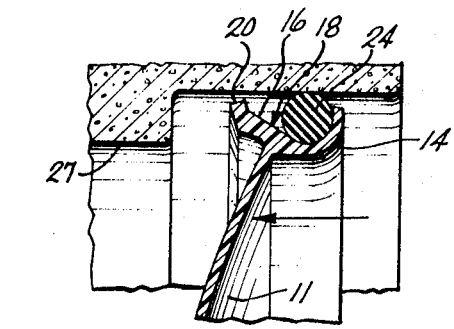
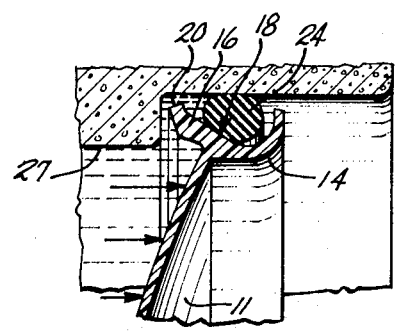
Fig. 1. Fig. 2. Fig. 3. Fig. 4. Fig. 5.
INVENTORS
ARTHUR E. KAISER
JEFFERSON M. FLUKE
BY Graybeal, Cole & Barnard
ATTORNEYS

---

3,467,271
PIPE CLOSURE PLUG ASSEMBLY
Arthur E. Kaiser, Seattle, and Jefferson M. Fluke, Kirkland, Wash., assignors to Kaiser Seal Company, Inc., Bothell, Wash., a corporation of Washington
Filed Feb. 26, 1968, Ser. No. 708,287
Int. Cl. B65d *39/12;* F16l *55/12*
U.S. Cl. 220—24.5
10 Claims

ABSTRACT OF THE DISCLOSURE

An all-plastic plug body having a central portion in the form of a concavo-convex disk and a peripheral circular sealing seat having a circumferential end flange and an outwardly facing sealing ring supporting surface inclined radially outwardly from the concave to the convex side of the disk for supporting an O-ring seal. The edge of the disk intersects the seat at about the midpoint of the sealing ring supporting surface. The seat also is provided with an abutment edge 20 that engages the radial inner wall of the bell-shaped end of the pipe when the plug is installed. The disk is flexible so that upon application of pressure it expands radially urging said sealing ring supporting surface radially outwardly to further compress the O-ring against the inner wall of the pipe. The circumferential end flange is relatively thin to permit deformation and easy removal from a mold.

CROSS REFERENCES TO RELATED APPLICATIONS

This application discloses subject matter similar to that shown in our U.S. Design Patent 210,826, issued Apr.23, 1968, which patent is directed to the ornamental features of a pipe closure plug.

BACKGROUND OF THE INVENTION

Field of the invention

The present invention relates to closure plug elements for temporarily blocking a passage, such as in a sewer pipe, and more particularly to a closure plug having improved fabricating and sealing characteristics for a bell-ended sewer pipe.

Description of the prior art

Heretofore the generally accepted practice for sealing sewer pipe and the like was to strap a circular wooden closure plug over the end of the pipe. Wooden plugs were generally unsatisfactory, however, as they often did not provide an adequate seal and were subject to rapid deterioration.

Other known plugs are of the cylindrical type as shown in the patents to Tillinghast 521,835 and Roberts, Sr. et al. 3,307,732. These plugs are expensive to manufacture, generally are unsuitable for conventional bell-type sewage pipe, and provide only limited sealing effectiveness.

Summary of the invention

The present closure plug employs an axially short, circular, all-plastic plug body having a central portion in the form of a concavo-convex disk circumscribed by a circular sealing seat having an outwardly facing sealing ring supporting surface that is inclined in a radially outward direction from the concave side of the disk to the convex side. Thus the closure plug is ideally suited for use in bell-shaped sewage pipes where only a plug of limited length may be employed. In addition, the disk is sufficiently thin and of a suitable material to permit axial deflection from pressure fluctuations and thus cause outward radial expansion of the sealing seat to further compress the sealing ring between the seat and the inside wall of the pipe. Still further, the all-plastic plug has a thin, deformable circumferential end flange which readily lends itself to simple mold-fabricating techniques.

BRIEF DESCRIPTION OF THE DRAWING

FIG. 1 is an isometric of a typical sewer pipe and a closure plug embodying the invention and with a portion thereof removed for clarity.

FIG. 2 is a diametrical section of the pipe and closure plug shown in FIG. 1.

FIG. 3 is a fragmentary section of the pipe and closure plug as it is being installed in the pipe.

FIG. 4 is a fragmentary section of the pipe and closure plug illustrating the sealing ring under compression from the normal pressure within the pipe.

FIG. 5 is a fragmentary section of the pipe and closure plug showing deformation of the disk under the influence of increased pressure in the pipe.

The closure plug illustrated comprises an all-plastic plug body 10 having a central portion in the form of a concavo-convex disk 11 circumscribed by a sealing seat 12. As best shown in FIG. 2, the disk 11 has a convex side 11a and a concave side 11b and is of a substantially uniform thickness throughout of about .125 inch. The plastic employed is polyethylene or the like, which is relatively flexible at such a thickness to provide axial deflection and thus radial expansion under pressure.

The sealing seat 12 is provided with a circumferential end flange 14 that curves inwardly and integrally connects with a radially outwardly facing sealing ring supporting surface 16. The sealing ring supporting surface is inclined such that its radial distance from the central axis of the disk is greater on the convex side of the disk than on the concave side. The angle of inclination is not critical, however, the angle must be sufficient to produce a wedging action on the sealing ring and in the preferred form is about 30° with respect to the disk central axis. An important feature is that the junction between the disk 11 and the circular seat 12 intersects the sealing ring supporting surface at its approximate midpoint, as indicated by the arrow 18. In this manner, the force acting on the sealing ring supporting surface through the disk is generally at the point of contact of the sealing ring and minimizes the twisting stresses acting on the junction. Extending radially outward from the end of the sealing ring supporting surface opposite the circumferential flange 14 is a circular abutment edge 20.

An O-ring seal 24 of an elastomeric material, such as rubber, is shown positioned in the circular sealing seat 12. The O-ring is of a sufficiently large internal diameter so that it extends radially outward beyond the abutment edge 20 and the circumferential flange 14. Thus when assembled and inserted in a pipe the O-ring 24 is substantially compressed between the inside surface of the pipe and the sealing ring supporting surface 15. A typical pipe 26 is shown in FIG. 4 and includes an inside surface 27 and an enlarged bell-shaped end 28 providing an inside surface 29 and a radial end surface 30.

During installation the closure plug is inserted into the bell-shaped end 28 of the pipe, with the convex side 11a of the disk innermost, by forcing it by hand or with light taps of a rubber mallet. Since the nominal diametrical dimension of the disk 11 and O-ring 24 substantially equals the diameter of the inside surface 29 a slight amount of force is required. In this manner the closure plug is moved inwardly until the abutment edge 20 engages the radial end surface 30 of the bell-shaped end of the pipe. Upon the application of fluid pressure from within the pipe, the closure plug body 10 is moved axially outwardly but the O-ring resists outward movement because of the friction between the inside surface 29 of the bell-shaped end and sealing ring. Consequently, as is best shown in FIG. 4, the O-ring is rolled up the sealing ring supporting surface 16 and is wedged tightly against the inside surface 29.

An important aspect of the invention is an auxiliary sealing feature which more positively effects the seal between the circular sealing seat 12 and the inside surface 29 of the pipe. As can be seen in FIG. 4, the application of force by the fluid in the pipe is over the entire convex surface 11a of the disk. Although during pressure increase the tendency for the O-ring 24 is to continue to roll up the sealing ring supporting surface 16, the sealing ring is also susceptible to axial slippage along the inside surface of the bell-shaped end of the pipe and may break the seal In the present invention this slippage tendency is substantially reduced as the forces acting to compress the O-ring are not only the wedging force caused by axial movement of the disk but in addition a force acting radially on the O-ring due to the expansion of the sealing ring supporting surface 16. This expansion is caused by axial deformation of the concavo-convex disk under the influence of pressure increases within the pipe. The expansion is clearly shown in exaggerated form in FIG. 5 by comparing the phantom position under normal use with the solid line position when under a pressure increase. In one example, calculations showed that about 1/16" radial expansion is produced at the sealing ring supporting surface 16 with a pressure of 15 p.s.i. acting on a closure plug approximately 8 inches in diameter. As can readily be seen, the O-ring is thus under the influence of two compressing forces, one caused by the axial movement of the disk and the other by the radial expansion of the circular sealing seat.

Another important aspect of the invention is that the closure plugs may be readily fabricated by inexpensive plastic molding techniques. This is accomplished by thinning the circumferential end flange 14, which is not a load bearing member, to a point where it is easily deformed for removing the closure plug from the mold. In a typical embodiment this thickness is about .08 inch.

Although the invention has been described in its preferred form, it is understood that various modifications and changes in the structural details shown and discussed may be made without departing from the principles of the invention.

What is claimed is:

1. In a pipe closure plug assembly comprising a central disk portion and a sealing ring seat portion circumscribing said disk portion and including a radially outwardly directed O-ring seal supporting surface, the improvement wherein said central disk portion is of thin walled, inwardly convexed, concavo-convex configuration, said O-ring seal supporting surface includes a frustum-like intermediate portion which is generally perpendicular to the disk portion side surfaces at the junction of said disk portion with said sealing ring seat portion, and which increases in diameter from its axial outer end to its axial inner end, with the junction of said disk and sealing seat portions occurring intermediate the ends of said sealing ring seat portion, and said sealing ring seat portion further includes an O-ring retaining lip at its outer end, disposed axially outwardly of the concave outer surface of said disk portion.

2. A closure plug assembly for sealing the open end of a tubular conduit such as a sewer pipe or the like, said assembly comprising:
   (a) a one-piece, essentially all-plastic plug body having
       (1) a central portion in the form of a concavo-convex disk, and
       (2) a sealing seat circumscribing said disk and having an outwardly facing sealing ring supporting surface extending at an incline with respect to the center axis of said disk, the edge of such disk intersecting said circular sealing seat at about the mid portion of said sealing ring supporting surface and the incline of said sealing ring surface being such that the radial distance of the inclined surface from the disk center axis is greater on the convex side of the disk; and
   (b) an elastomeric sealing ring engaging said sealing ring supporting surface.

3. The closure plug defined by claim 2, wherein said disk is relatively thin so that it is sufficiently flexible to deform axially and expand the sealing ring supporting surface radially outwardly upon the application of a predetermined pressure to the convex surface of said disk.

4. The closure plug defined by claim 3, in combination with a pipe having a cylindrical inner surface, wherein said sealing ring is in sealing engagement with said sealing ring supporting surface and said pipe inner surface whereby a tighter seal is effected upon application of said predetermined pressure.

5. The closure plug defined by claim 3, wherein said circular sealing seat includes a circumferential end flange integrally joined with said sealing ring supporting surface at the concave side of said disk.

6. The closure plug defined by claim 4, wherein said sealing ring is an elastomeric O-ring.

7. The closure plug defined by claim 4, wherein said circular sealing seat is provided with a circumferential abutment edge and wherein said pipe has a bell-shaped end that includes a radial lip terminating outwardly at said cylindrical inner wall, said abutment edge being in engagement with said radial lip.

8. The closure plug defined by claim 3, wherein said disk is of a substantially uniform thickness of about .125 inch.

9. The closure plug defined by claim 5, wherein said circumferential end flange is about .08 inch thick.

10. The closure plug defined by claim 9, wherein said plug body consists essentially of molded polyethylene.

References Cited

UNITED STATES PATENTS 2,737,205  3/1956  Stringfield _____ 138—89

FOREIGN PATENTS 167,806  8/1921  Great Britain.
1,189,568  10/1959  France.

GEORGE E. LOWRANCE, Primary Examiner

U.S. Cl. X.R.

138—89